United States Patent [19]
Sulc et al.

[11] Patent Number: 5,158,832
[45] Date of Patent: Oct. 27, 1992

[54] LENSES FROM POLYMERIC DERIVATIVES OF ACRYLIC AND METHACRYLIC ACIDS

[75] Inventors: Jiří Šulc; Zuzana Krčová, both of Prague, Czechoslovakia

[73] Assignee: Ceskoslovenská akademie ved, Prague, Czechoslovakia

[21] Appl. No.: 447,153

[22] Filed: Dec. 7, 1989

[51] Int. Cl.$^5$ .................... G02C 7/04; C08F 8/32; B32B 27/30

[52] U.S. Cl. .................... 428/522; 428/516; 351/160 H; 351/160 R; 427/164

[58] Field of Search ............. 428/522; 351/160 R, 351/160 H; 523/106

[56] References Cited

U.S. PATENT DOCUMENTS

| | | | |
|---|---|---|---|
| 4,128,318 | 12/1978 | Sieglaff et al. | 523/106 |
| 4,632,527 | 12/1986 | Masso et al. | 428/922 |
| 4,893,918 | 1/1990 | Sulc et al. | 351/160 R |

Primary Examiner—P. C. Sluby
Attorney, Agent, or Firm—Leydig, Voit & Mayer

[57] ABSTRACT

A lens made from a non-hydrophilic acrylate or methacrylate polymer or copolymer for application in an aqueous medium inside a human eye or on its surface, i.e., an intraocular or contact lens, is provided wherein the originally non-hydrophilic surface layer has been hydrophilized by a partial hydrolysis or sulfonation in such a way that a gradient of swelling results such that the swelling decreases from a maximum on the very surface to a minimum in the non-swelling core, which is unaffected by hydrophilization. Accordingly, light reflexes are eliminated or at least substantially reduced as well as the tendency of the surface to grow cells, the irritation of neighboring living tissues, and the formation of pressure necroses.

3 Claims, No Drawings

LENSES FROM POLYMERIC DERIVATIVES OF ACRYLIC AND METHACRYLIC ACIDS

FIELD OF THE INVENTION

The invention pertains to lenses made from polymeric derivatives of acrylic acid and methacrylic acid, in particular to lenses that are used in an aqueous medium, for example, contact or intraocular lenses, which were non-hydrophilic before being processed according to this invention.

BACKGROUND OF THE INVENTION

The polymeric derivatives are polymers and copolymers, in which the side carboxylic groups have been replaced with non-hydrophilic groups, in particular with ester, thioester, nitrile, N-substituted amide or hydrazide, and anhydride groups. The decisive criterion by which these lenses differ from known hydrogel lenses is non-hydrophilicity, i.e., the inability to absorb physically more than 1% water when in constant contact with water or an aqueous medium. Non-hydrophilic plastics are either not wetted or only somewhat wetted with water and their surface is usually much harder than the surface of the cornea and other tissues of living organs, in particular the eye. They are mainly used in the manufacture of lenses because of their excellent optical properties, such as high transparency and refractive index of light, and also for their relatively good biological tolerance by living tissues and body liquids and their excellent stability in an organism. The ease with which such plastics can be processed to form lenses is also advantageous.

The most often used material for a lens is poly(methyl methacrylate) and, to a lesser extent, copolymers of methyl methacrylate with other esters of methacrylic acid or acrylic acid. The supporting parts, which serve for the proper fixation and centering of the lens, are sometimes made from other polymers, for example, from polypropylene, poly(vinyl ether), and others.

These lenses have, in addition to the above cited properties, some less advantageous features. It is, above all, the above-mentioned relatively high hardness, which may cause, under unfavorable conditions, irritation and pressure necroses. Further inconvenient properties are the tendency to create light reflexes, increased reaction on a foreign body, and the tendency to form non-transparent layers of cells, which may considerably deteriorate the excellent optical properties of the lenses after a long period of time.

Surface saponrfication of hydrogel lenses from lightly crosslinked poly(hydroxyethyl methacrylate) with alkaline hydroxides in the presence of a salt, the aqueous solutions of which do not swell the synthetic hydrogel, has been already proposed (Czechoslovak Patent Application 215-87). The presence of salts reduces the depth of the swelling gradient, which is undesirable. Also, hydrophilization is not of concern because the hydrogels are always hydrophilic.

The thickness of the greater swelling surface layer must not be too large, not only because of the above-mentioned undesirable decrease in refractive index, but also because mechanical resistance and, above all, tear resistance (resistance against tearing and further propagation of a tear from the edge of the lens) strongly decrease with an increase in swelling capacity. The formation of light reflexes is insignificant in hydrogel swollen lenses because the difference in refractive indices of the swollen lens and the surrounding aqueous medium is small. The differences between the properties of known hard lenses, e.g., made from poly(methyl methacrylate), are so great that a simple transferring of knowledge about one material to another material is unthinkable because the effect of processing is not the same for both types.

SUMMARY OF THE INVENTION

An object of the invention is a lens made from non-hydrophilic polymeric derivatives of acrylic acid and methacrylic acid that is characterized by a transparent hydrophilic layer created on its surface, the swelling of which in aqueous medium continuously decreases in the direction from the surface to the unswollen core, which remains unaffected by hydrophilization. The surface layer is hydrophilized in such a way that it exhibits a marked gradient of swelling, with maximum swelling occurring at the surface. In this way, reflexes are avoided because the greater the refractive index of the interface of the lens and the surrounding medium, the larger are the reflexes. This difference is reduced to a minimum by swelling with the gradient.

Another advantage of the lens, according to the present invention, is the reduction in growth of cells on its surface due to the decrease in deposition of the cells on the soft, highly swollen, elastic surface.

DETAILED DESCRIPTION OF THE INVENTION

Hard lenses made from poly(methyl methacrylate) and similar materials can be very easily worked and the smoothness attained on the surfaces of the lenses is much better in comparison to lenses prepared by polymerization casting. But even the smallest unevenness, which cannot be removed by polishing, may be eliminated by formation of a swelling layer directly from the material of the lens. In other words, a perfectly smooth surface can be obtained by the method of the present invention easier than by mere mechanical processing.

Also, the maximum tolerance is attained at the same time because the specific pressure of the supporting parts on the neighboring living tissues is reduced and the surface layer becomes elastic and soft. This effect also is obtained if the thickness of the surface layer is small.

Provided the hydrophilization agent, for example, inorganic acid, is concentrated enough to strongly swell or even dissolve the polymer from which the lens is made, the swelling and solubility can be reduced in the known way by addition of an inert salt to the hydrophilization agent in a suitable concentration. Acids are suitable soluble salts, e.g., alkaline salts of the same acid. In contrast to hydrogel lenses, this is not necessary if the hydrophilization is carried out by saponification with a strong base because the non-hydrophilic polymeric derivatives of acrylic acid and methacrylic acid neither swell nor dissolve in aqueous alkaline solutions. The saponification proceeds, in this case, in layer after layer and the product is soluble in water and in an alkaline solution, if whole molecules of the polymer are saponified. Although the swelling can be increased by addition of a suitable solvent, the hydrophilization with a strong inorganic acid, such as sulfuric, nitric or phosphoric acid, is more advantageous. The thickness of the created hydrophilic layer depends then on swelling of the polymer in the hydrophilization agent.

During hydrophilization with a strong acid, e.g., sulfuric acid, the surface layer may be crosslinked, reinforced and stabilized by the known method, which consists of addition of a multifunctional alcohol, such as glycerol, diethylene glycerol, or tripropylene glycol, i.e., of such polyol in the molecule of which remains at least one hydrophilic group, for example, hydroxyl, ether, or acetal group, after esterification of its two hydroxyl groups.

Swelling of the polymer in the used acid may be lowered to the required value also by diluting the acid, in particular sulfuric acid, with water or by decreasing the temperature during prolonged action of the reagent, or by choosing the time of action at a constant temperature.

Also, reactions other than hydrolysis can be employed for the hydrophilization of the surface layer, for example, sulfonation with sulfur trioxide gas or other known reagents.

Everywhere that the swelling gradient or the continuous decrease in swelling has been mentioned, it is understood that between the minimum and maximum of swelling there do not exist abrupt transitions, which could occur if the swelling changes were obtained by gradual application of layers with different swelling capacities of the same or another partly or completely hydrolyzed or sulfonated polymer.

The continuous decrease in swelling usually is not linear due to the fact that the diffusion of the reagent into the polymer has a definite velocity and, consequently, the period of its action is of various length in different layers. Moreover, the concentration of reagent and side reaction products also vary during the reaction. Fortunately, the suitable reaction conditions may be easily determined empirically.

The invention is further illustrated by the following examples.

EXAMPLE 1

An intraocular lens, which was made from poly(methyl methacrylate) for deposition into the lens capsule, after removal of the natural lens that has been afflicted with cataract, and which has been provided with side supporting elements in the shape of two opposite 0.12 mm thick and twice regularly cranked projections from the same material, was immersed for 1 minute into a saturated solution of sodium hydrogen sulfate in 80% sulfuric acid at 80° C. It was rapidly neutralized by dipping into a 5% aqueous solution of sodium hydrogen carbonate for 15 minutes at 50° C., thoroughly washed in deionized water, and eventually stored in the sterile 0.8% solution of sodium chloride in distilled water. In this manner, a thin layer was created on the surface of the lens, which was lustrous when wet and had a swelling capacity in physiologic saline, which ranged from 0 to 90% in the direction from the unaffected core to the surface of the lens.

EXAMPLE 2

The experiment according to Example 1 was repeated with the distinction that 5 vol. % of triethylene glycol was added to the hydrophilization agent. The prepared hydrophilic surface layer was approximately 50% thicker than the layer obtained in Example 1, retained its resistance to wear, and had a lower friction coefficient in water.

EXAMPLE 3

The lens described in Example 1 was immersed for 2 minutes into 66% sulfuric acid at 85° C. and further worked out as described in Example 1.

EXAMPLE 4

The lens according to Example 1 was immersed for 15 minutes at 40° C. into 55% nitric acid, in which sodium nitrate was dissolved almost to saturation before use. The neutralization and washing were carried out in the same way as in Example 1, but at 70° C.

We claim:

1. Lens from a non-hydrophilic acrylate or methacrylate polymer or copolymer designed for application in water medium inside a human eye or on its surface, comprising a transparent hydrophilic layer on the surface of said lens, and a non-hydrophilic core surrounded by said hydrophilic layer, where the swelling of said hydrophilic layer in an aqueous medium continuously decreases in the direction from said lens surface to said core.

2. The lens according to claim 1, wherein the surface hydrophilic layer is crosslinked.

3. The lens according to claim 2, wherein the surface hydrophilic layer is crosslinked with an ester-bonded multifunctional alcohol, which has, in addition to ester-bonded hydroxyl groups, at least one additional free hydrophilic group.

* * * * *